United States Patent
Lanzl et al.

(10) Patent No.: US 9,816,668 B2
(45) Date of Patent: Nov. 14, 2017

(54) DEVICE FOR STORING AND DELIVERY OF A LIQUID AND/OR GASEOUS MEDIUM UNDER PRESSURE, AS WELL AS A FUEL ENERGY CONVERSION DEVICE AND METHOD FOR ASSEMBLING A DEVICE FOR STORING AND DELIVERY OF A LIQUID AND/OR GASEOUS MEDIUM UNDER PRESSURE

(71) Applicant: REHAU AG + CO, Rehau (DE)

(72) Inventors: Thomas Lanzl, Marktredwitz (DE); Franz Hofmann, Munchberg (DE)

(73) Assignee: REHAU AG + CO., Rehau (DE)

( * ) Notice: Subject to any disclaimer, the term of this patent is extended or adjusted under 35 U.S.C. 154(b) by 308 days.

(21) Appl. No.: 14/766,311

(22) PCT Filed: Feb. 6, 2014

(86) PCT No.: PCT/EP2014/000324
§ 371 (c)(1),
(2) Date: Aug. 6, 2015

(87) PCT Pub. No.: WO2014/121935
PCT Pub. Date: Aug. 14, 2014

(65) Prior Publication Data
US 2015/0362130 A1 Dec. 17, 2015

(30) Foreign Application Priority Data

Feb. 8, 2013 (DE) .................... 20 2013 100 594 U
Feb. 13, 2013 (DE) ........................ 10 2012 101 425

(51) Int. Cl.
*F17C 13/04* (2006.01)
*F17C 1/06* (2006.01)
(Continued)

(52) U.S. Cl.
CPC ............... *F17C 13/04* (2013.01); *F17C 1/06* (2013.01); *F17C 1/16* (2013.01); *H01M 8/04104* (2013.01); *H01M 8/04201* (2013.01); *F17C 2201/0109* (2013.01); *F17C 2201/056* (2013.01); *F17C 2203/011* (2013.01); *F17C 2203/0604* (2013.01); *F17C 2203/066* (2013.01); *F17C 2203/0619* (2013.01); *F17C 2203/0663* (2013.01);
(Continued)

(58) Field of Classification Search
CPC .... F17C 1/06; F17C 1/16; F17C 13/04; F17C 2201/0109; F17C 2201/056; F17C 2203/0604; F17C 2203/0619; F17C 2203/066; F17C 2203/0663; F17C 2203/0675; F17C 2205/0305; F17C 2205/0338; F17C 2205/0323; F17C 2209/2127; F17C 2209/2145; F17C 2209/22; F17C 2221/012; F17C 2223/0123; F17C 2223/0161; F17C 2223/036; F17C 2260/036; F17C 2270/0168; F17C 2270/0184; Y02E 60/321; Y10T 29/49414; Y02T 90/32; H01M 8/04201; H01M 8/04104; H01M 2250/20
See application file for complete search history.

(56) References Cited

U.S. PATENT DOCUMENTS

2007/0012551 A1   1/2007  Rohwer et al.

FOREIGN PATENT DOCUMENTS

| DE | 2152123  | 5/1973  |
|----|----------|---------|
| DE | 19631546 | 11/1997 |

(Continued)

OTHER PUBLICATIONS

English Abstract of JP2001050494.
English Abstract of DE2152123.
English Abstract of DE19631546.
English Abstract of DE102009049948.
(Continued)

*Primary Examiner* — Brittany Raymond
(74) *Attorney, Agent, or Firm* — Preston Smirman; Smirman IP Law, PLLC (57) ABSTRACT

The present invention relates to a device for the storage and delivery of liquid and/or gaseous media under pressure, having a media container (1) of a plastics material, preferably of polyamide, receiving the medium, at least one valve connection element (2), connected to the media container (1), and at least one valve element (3, 3a, 3b), connectable to the valve connection element (2), wherein the media container (1) has a collar (4), which is molded on in one piece and protrudes from the media container (1) and has a collar outer wall (5) and a collar inner wall (6). A restoring element (11, 11a, 11b) is arranged in such a way that, during the fitting of the valve element (3, 3a), the collar (4) and the restoring element (11, 11a, 11b) are jointly pressed between a partial region (9a) of the wall (9) and the pressing portion (10), wherein the restoring element (11, 11a, 11b) is formed from a crosslinked plastics material, preferably from crosslinked polyethylene, and wherein the pressing portion (10), the collar (4) and the restoring element (11, 11a, 11b) are made to match one another and formed in such a way that the joint pressing of the collar (4) and the restoring element (11, 11a, 11b) has the effect that an elastic deformation (X) of the restoring element (11, 11a, 11b) that is greater than the maximum creep deformation (Y) of the collar (4) over the service life of the device can be set, and so the creep deformation (Y) of the collar (4) can be compensated by way of the restoring element (11, 11a, 11b). The invention also relates to a fuel-energy conversion device, a motor vehicle and a method for fitting a device for the storage and delivery of liquid and/or gaseous media under pressure.

20 Claims, 7 Drawing Sheets

(51) Int. Cl.
  *H01M 8/04*     (2016.01)
  *F17C 1/16*     (2006.01)
  *H01M 8/04089*  (2016.01)
  *H01M 8/04082*  (2016.01)

(52) U.S. Cl.
  CPC .............. *F17C 2203/0675* (2013.01); *F17C 2205/0305* (2013.01); *F17C 2205/0323* (2013.01); *F17C 2205/0338* (2013.01); *F17C 2209/2127* (2013.01); *F17C 2209/2145* (2013.01); *F17C 2209/22* (2013.01); *F17C 2221/012* (2013.01); *F17C 2223/0123* (2013.01); *F17C 2223/0161* (2013.01); *F17C 2223/036* (2013.01); *F17C 2260/036* (2013.01); *F17C 2270/0168* (2013.01); *F17C 2270/0184* (2013.01); *H01M 2250/20* (2013.01); *Y02E 60/321* (2013.01); *Y02T 90/32* (2013.01); *Y10T 29/49414* (2015.01)

(56) References Cited

FOREIGN PATENT DOCUMENTS

| | | |
|---|---|---|
| DE | 102009049948 | 5/2011 |
| DE | 102010018700 | 11/2011 |
| DE | 102011012705 | 11/2011 |
| DE | 102010023386 | 12/2011 |
| EP | 0821104 | 1/1998 |
| EP | 2115343 | 11/2009 |
| JP | 2001050494 | 2/2001 |
| WO | 2013020668 | 2/2013 |
| WO | 2013020694 | 2/2013 |

OTHER PUBLICATIONS

English Abstract of DE102010018700.
English Abstract of DE102010023386.
English Abstract of DE102011012705.
English Abstract of EP0821104.
English Abstract of EP2115343.

DEVICE FOR STORING AND DELIVERY OF A LIQUID AND/OR GASEOUS MEDIUM UNDER PRESSURE, AS WELL AS A FUEL ENERGY CONVERSION DEVICE AND METHOD FOR ASSEMBLING A DEVICE FOR STORING AND DELIVERY OF A LIQUID AND/OR GASEOUS MEDIUM UNDER PRESSURE

CROSS-REFERENCE TO RELATED APPLICATION

The instant application is a national phase of PCT International Application No. PCT/EP2014/000324 filed Feb. 6, 2014, and claims priority to German Patent Application Serial No. 200213100594.0, filed Feb. 8, 2013, and German Patent Application Serial No. 102013101425.9, filed Feb. 13, 2013, the entire specifications of all of which are expressly incorporated herein by reference.

The present invention relates to a device for storing and delivery of a liquid and/or gaseous medium under pressure, comprising a medium container to hold the medium made of a plastic material, at least a valve connecting element connected to the medium reservoir and at least a valve element that can be connected with the valve connecting element, wherein the medium container has a one-piece collar protruding from the medium container and having a collar outer wall and a collar inner wall. The end of the collar is defined here by the free cross-section of an opening of the medium container, wherein the said valve connecting element is arranged in the area of this opening, while a section of a collar outer wall is arranged opposite a section of the wall of the valve connecting element.

Such a device for storing and delivery of a liquid and/or gaseous medium under pressure is known, for example, from EP 2115343 B1. In this case, a section of the valve element penetrates the opening and is surrounded by the collar wall. In order to prevent the liquid and/or gaseous medium escaping under pressure from inside the medium container, a number of O-ring seals is provided between this section and the collar inner wall in the area of this section. Leakage of the medium can be permanently prevented due to the deformation properties of the O-rings. A disadvantage here, however, is that, due to the dimensions of the O-rings, a seal between the section of the valve element and the collar inner wall can only be achieved in a very small, i.e. circular, area. The document, therefore, proposes that, in order to increase the sealing surface, at least a second O-ring is required to ensure a permanent medium tightness. The O-rings also seal the collar inner wall against the medium container to ensure permanent sealing of the O-rings with respect to a plastic material, but their long-term deformation or creep is very likely to lead to leaks.

The document EP 0821104 B1 proposes, on the other hand, that a clamping ring should be able to be screwed into the valve connecting element, which merges into a truncated conical section. This last-named truncated section then presses the inner wall of the neck section of a medium container, which is provided with a section corresponding to the taper, against the inner wall of the valve connecting element. The disadvantage, in this case, is that this taper of the truncated section and the corresponding taper of the collar inner wall must be adjusted very precisely to one another in order to ensure adequate tightness, so that the pressurised medium cannot be diffused or flow between the clamping ring and the inner wall of the valve connecting element (and consequently between the inner wall of the valve connecting element and the collar outer wall) and exit from the medium container. Obtaining permanent tightness is particularly difficult when a medium container is made of a thermo-plastic material. Due to the resultant shear/compressive stresses between the collar of a thermoplastic plastic material and the truncated conical section, the thermoplastic plastic material accordingly tends to avoid the applied shear/compressive stress. One refers to this as the so-called flow or creep of the plastic material. This has the consequence that, over time, the pressing action becomes looser or more relaxed and thus necessarily leads to leakiness.

A disadvantage of the prior art is, therefore, that, in particular with respect to ensuring permanent tightness of the medium container between the valve connecting element and the collar of the medium container, it is costly, and, in particular, requires an additional sealing element.

The invention, therefore, has the object, of developing a device for storing and delivery of a liquid and/or gaseous medium under pressure so that it ensures an improved and permanent tightness with a small number of sealing elements.

This object is achieved by a device for storing and delivery of a liquid and/or gaseous medium under pressure, and comprising:
  a medium-holding medium container made of a plastic material, especially of a thermoplastic material, preferably a polyamide,
  at least a valve connecting element connected to the medium reservoir,
  at least a valve element that can be connected to the valve connecting element,
  wherein the medium container is integrally formed and comprises a collar having a collar outer wall and a collar inner wall preferably protruding outwards from the medium container, wherein the end of the collar defines the free cross-section of an opening of the medium container, wherein the valve connecting element is arranged in the area of this opening, while a section of the collar outer wall is arranged opposite a section of a wall of the valve connecting element, and wherein the valve element has a pressing section that lies opposite a section of the collar inner wall in the assembled state of the device, wherein, additionally, a restoring element is arranged at least between the section of the wall and the pressing section so that, upon assembly of the valve element, the collar and the restoring element are pressed together between the section of the wall and the pressing section, wherein the restoring element consists of a cross-linked plastics material preferably formed from cross-linked polyethylene, and wherein the pressing section, the collar and the restoring element are so matched and formed that the elastic deformation of the restoring element is caused by the joint pressing of the collar and the restoring element, and is greater than the maximum creep deformation of the collar over the service life of the device, so that the creep deformation of the collar can be compensated by the restoring element and a permanent press fit created between the pressing section, the collar, the restoring element and the section of the wall. In the event that the restoring element abuts the section of the wall, then the sealing area between the section of the wall and the restoring element and the sealing area between the restoring element and the collar, are sealed against the pressurised medium. Also in the case where the collar abuts the section of the wall, the sealing area between the section of the wall and the collar is sealed against the pressurised medium. In this connection, a permanent press fit means that the press fit is maintained at least over the normal service life of the device according to the invention and under normal conditions of use. The service life may, in particular, correspond to five thousand filling cycles of the device at 20 bar to 875 bar, wherein the filling rate and the temperature of the medium or the media is adjusted so that the temperature of the valve element, in particular the pressing section, and/or the valve connecting element reaches a maximum value of 85° C. during filling. Five thousand filling cycles corresponds, for example, to a device for a motor vehicle with a tank filling volume for a range of 500 km with a normal motor vehicle service life of 250,000 km. According to the invention, the creep deformation of the plastic material of the collar can be compensated by a restoring element made of a cross-linked plastic material. A cross-linked plastic, in particular a cross-linked thermoplastic, shows no, or negligible, flow processes (creep) and behaves largely purely elastically. Therefore, the cross-linked plastic material is itself subject to no, or only a clearly lower, creep deformation and rebounds to a certain extent so that the creep deformation of the collar is compensated, creating a permanent press fit between the pressing section, the collar, the restoring element and the section of the wall, and sealing against the pressurised medium.

It has been found to be particularly advantageous, in this case, to use cross-linked polyethylene for the cross-linked plastic material of the restoring element. It has been found to be advantageous, in this case, to use cross-linking of polyethylene at elevated temperatures through radical-forming peroxides (PE-Xa) for the cross-linking. Moreover, silane cross-linking of polyethylene (PE-Xb) or radiation cross-linking of polyethylene (PE-Xc) can be used. The degree of cross-linking of the thermoplastic resin or the polyethylene according to the present invention is 20% to 95%, preferably 50% to 90% and more preferably 75% to 85%. Cross-linking levels of at least 70% have been found to be particularly suitable for devices with media having a permissible pressure of the medium significantly above 500 bar. In principle, the valve element is also referred to as an On-Tank-Valve (OTV in short). The pressurised medium may, in particular, be hydrogen ($H_2$). The device then serves for the storage and delivery of a liquid and/or gaseous hydrogen under pressure. The permitted pressure of the medium within the device according to the invention can vary between 200 bar to 1500 bar, preferably between 400 bar and 1250 bar, more preferably between 600 bar and 1000 bar, particularly preferably between 600 bar and 800 bar.

The medium container may be made of a plastic material, preferably of a thermoplastic material. Particularly suitable are polyamide (preferably polyamide 6, polyamide 6.6, polyamide 12, PA 6.10, PA 6.12, PA 10 or PA 11), or elastomer-modified polyamide (preferably PA 6.66), polypropylene, polyethylene (preferably high density polyethylene "HDPE"), polyoxymethylene, polyphenylene sulphide, polyethersulphone, polyetheretherketone, polyetherimide, polyethylene terephthalate, or comparable technical or high temperature plastic materials, or combinations of the aforementioned plastic materials. Alternatively, the medium container can be made of a cross-linked plastic material, preferably less cross-linked than the plastic material of the restoring element. An example would be cross-linked polyethylene having a degree of cross-linking of between 5% and 50%, preferably between 5% and 25%.

The pressing section, the collar and the restoring element are preferably matched and formed so that, by the joint pressing of the collar and the restoring element, the elastic deformation of the restoring element can be adjusted to correspond to at least 0.3 times, preferably at least 0.5 times, more preferably at least 0.8 times, even more preferably at least 1.0 time, particularly preferably at least 1.2 times, the wall thickness of the collar prior to assembly of the valve element. Appropriately adjusted dimensioning of the wall thickness of the restoring element with respect to the wall thickness of the collar, or between the elastic deformation of the restoring element and the wall thickness of the collar, have proved to be particularly advantageous. This can be seen in terms of a balance between ensuring adequate media tightness of the device and the assembly forces applied during assembly of the valve element.

Preferably, the wall thickness of the restoring element is greater than the wall thickness of the collar by at least 1.0 times, preferably at least 1.2 times, more preferably at least 1.5 times, even more preferably at least 1.8 times, particularly preferably at least 2.2 times, most preferably at least 2.5 times. In this case, the wall thickness of the collar corresponds particularly to the wall thickness enclosed by the section of the collar outer wall and the section of the collar inner wall.

The pressing section may have a cylindrical or truncated cone-shaped geometry. In particular, a cylindrical geometry or stepped successive cylindrical geometries have proven to be particularly preferred in the production of such devices, since, in this case, the required tolerances can be most easily implemented and adhered to. In addition, a cylindrical geometry offers a uniform press fit and a uniform compressive stress distribution along the entire contact surface (sealing surface) between the pressing section and the collar or the restoring element (depending on where the restoring element is arranged).

The restoring element and the collar may be sleeve-shaped and may thus be plugged or clipped together. Sleeve-shaped, as used here, also means geometries that are trapezoidal, or rectangular and trapezoidal in longitudinal section. The collar and/or the restoring element may, in this case, have a funnel shape. In this case, the pressing section may be enclosed by the restoring element and the collar, wherein the outer diameter of the pressing section is greater than the inner diameter of the collar and/or the restoring element prior to assembly of the valve element. The last-mentioned inner diameter is dependent on whether the restoring element or the collar is positioned on the inside in the restoring element/collar pairing, with the possibility that both inner diameters (that of the collar and that of the restoring element) may be smaller than the outer diameter of the pressing section. In the case of a truncated cone-shaped geometry, the respective outer diameter of the pressing section, before assembly of the valve element, is larger than the respective corresponding or opposing inner diameter of the restoring element and/or collar in the assembled state.

Preferably, the quotient is the difference between the outer diameter of the pressing section and the inner diameter of the restoring element and/or the collar with respect to the inner diameter of the restoring element, and/or the collar lies in a range between 0.001 to 0.3, preferably between 0.01 and 0.2, more preferably between 0.08 to 0.15, even more preferably between 0.1 and 0.12. This quotient, referred to as oversize, has an optimised value for these areas. This optimised value ensures acceptable assembly forces of the valve element for a press fit guaranteeing permanent tightness. By way of example, upon assembly of the valve element, this oversize leads to the pressing of the sleeve-shaped collar and restoring element, wherein the restoring element is preferably so formed that it is not only pressed radially, but is also elongated in the direction of assembly.

The restoring element may alternatively be disk-shaped. In this case, a flange is formed at the upper end of the collar framing an opening, preferably forming an angle with the collar between 20° to 170°, wherein the underside of the flange forms the section of the collar outer wall, while the upperside of the flange forms the section of the collar inner wall.

Alternatively, it is conceivable to so form a restoring element that it is formed from a combination of a sleeve-shaped and a disk-shaped geometry. In this case, several pressing sections may be provided on the valve element, wherein it is surrounded by the return element and the collar, wherein, before assembly of the valve element, the outer diameter of the pressing section is greater than the inner diameter of the collar and/or the restoring element, and wherein a flange is formed at the upper end of the collar with an additional flange framing the opening, preferably forming an angle with the collar between 20° to 170°, wherein the underside of the flange forms the section of the collar outer wall, while the upperside of the flange forms the section of the collar inner wall, and the further pressing section is located opposite the flange upperside in the assembled state.

The restoring element can have at least one defined surface irregularity on or in the surface of the restoring element, in particular in the form of protrusions or recesses. This surface irregularity causes a punctiform and/or linear increase in the compressive stress and permits a further improvement in the sealing effect.

Alternatively or in combination, the collar or the collar outer wall or the collar inner wall also has at least a defined surface irregularity. This surface irregularity causes a punctiform and/or linear increase in the compressive stress and permits a further improvement in the sealing effect.

Examples of a defined surface irregularity would be specifically adjusted roughness values, a defined herringbone pattern, ribs or other protrusions or recesses on or in the surface of the restoring element and/or the collar.

The defined surface irregularity may, in particular, be in the form of a restoring element that is wave-shaped longitudinally and/or in cross-section and/or a wave-shaped collar. In this case, the restoring element and/or the collar preferably have/has a constant wall thickness.

The longitudinal and/or cross-sectional wave-shaped restoring element and/or longitudinal and/or cross-sectional wave-shaped collar may be wave-shaped in a section, in segments or over the entire length. Due to the joint pressing of the collar and restoring element, the longitudinal and/or cross-sectional wave-shaped collar and/or the longitudinal and/or cross-sectional wave-shaped restoring element are/is largely smoothed, so that no, or compared to the initial state before assembly of the valve element flattened, waveform arises. Advantageously, in this case, a press fit with a higher compression can be created without increasing the assembly forces of the valve element to the same extent. Due to the inventive use of a cross-linked plastic material for the restoring element, preferably a cross-linked polyethylene, the cross-linked plastic material strives to take up the original waveform again upon changes in temperature, particularly in the case of temperature increases, so that a temperature change, especially a temperature increase, also creates the self-sealing effect between the section of the wall of the valve connecting element, the collar, the restoring element and the pressing section. This effect can be supported by the section of the wall of the valve connecting element likewise having a defined surface irregularity, preferably in the form of ribs or protrusions which are further preferably likewise in the form of a waveform. The material of the collar and/or restoring element then strives to return to its original form when the temperature changes, especially in the case of increased temperature, and so seal the spaces between the ribs or protrusions. Preferably, the surface irregularity of the internal wall of the valve connecting element is formed by ribs or protrusions, which are arranged in a waveform, wherein the wavelength and/or amplitude of this waveform is set to be smaller than the wavelength and/or amplitude of the longitudinal and/or cross-section waveform of the restoring element and/or the collar. This advantageously ensures that a wave crest of the waveform in the longitudinal and/or cross-sectional restoring element and/or collar lies opposite a wave crest of the section of the wall of the valve connecting element and produces a very high compression in this area and offers further related improved sealing.

It is particularly preferable if at least a latching element is arranged on the restoring element to interact with a counterpart latching element formed on the inner wall of the valve connecting element so that, during assembly of the valve element, a displacement of the restoring element relative to the valve connection element and/or the collar is prevented. The latching element is preferably integrally formed on the restoring element, and more preferably arranged above the collar in the assembled state. Advantageously, the press fit or the pressing can be further reinforced as this would result in higher assembly forces being required to assemble the valve element, wherein, however, these higher assembly forces cannot lead to an adverse movement or squashing of the restoring element and/or the collar as a displacement of the restoring element and/or the collar due to the latching element/counterpart latching element pairing is hindered or prevented. The latching element can, in particular, be laterally offset with respect to the restoring element so that the latching element can no longer be withdrawn from the counterpart latching element due to the pressing section of the valve element being introduced into the collar or the restoring element.

Alternatively, the counterpart latching element can protrude from the section or above the section of the wall of the valve connecting element and the latching element may be formed by a recess or an opening in the restoring element and/or collar in which the counterpart latching element engages.

The latching member is preferably formed integrally with the restoring element or the collar, for example, formed or shaped mechanically (e.g. by milling) or during production (e.g. using a plastic injection moulding process in the production of the restoring element 11, 11*a*).

The wall thickness of the collar is preferably less than the wall thickness of the adjacent medium container. The typical wall thickness of the medium container lies in the range of 2 to 6 mm, wherein the reduced wall thickness of the collar is preferably in the range of 0.5 to 2 mm.

The valve element may be constructed in several parts, wherein the pressing section is preferably arranged on a separate, also preferably sleeve-shaped, first segment of the valve element. The multi-part structure is advantageous in the event of maintenance or repair of the device according to the invention, as only a part or a segment of the valve element will have to be exchanged or serviced.

Preferably an additional sealing element, preferably in the form of an O-ring, is provided above the collar and/or the restoring element to seal the valve connecting element against the valve element. Advantageously, the seal is thus effected between the valve connecting element and the valve element and not between the valve connecting element and the collar. This is of particular advantage when the valve connecting element and the valve element (in particular made of a special light metal such as aluminium, titanium or magnesium) are formed from a metallic material. Such metallic materials tend not to creep at the operating temperatures of the device so that an additional permanent seal is ensured by the direct sealing of this metallic valve connecting element against the metallic valve element by means of a sealing element. The sealing element may be fixed in position by a support element (e.g. a support ring). The support element prevents a change in position of the sealing element in the gap between the valve element and the valve connecting element in or during the use of the device. The support element may also prevent loosening of the sealing element from its recess on the valve element (such as by means of a circumferential annular groove within the valve element). The support element is preferably located in the same recess as the sealing element.

In the event that the valve element is constructed in several parts, wherein the pressing section is arranged on a separate, preferably sleeve-shaped, first segment of the valve element and above the collar and/or the restoring element, a sealing element, preferably in the form of an O-ring, is provided to seal the valve connecting element against the valve element, wherein the sealing element is preferably arranged on a separate second segment of the valve element. The sealing element can then advantageously be easily changed or serviced.

It is particularly preferred that no separate sealing element is provided in the area of the pressing section and in the section of the wall. In particular, no separate sealing element is provided between the area of the pressing section and the section of the wall. The pressing of the restoring element and the collar according to the invention leads to a significantly larger sealing surface between the section of the wall of the valve connecting element and the pressing section than devices hitherto known in the prior art, wherein additional sealing elements can be completely omitted in this area. In the event that the restoring element can abut the section of the wall of the sealing area between the section of the wall and the restoring element and the sealing area between the restoring element and the collar, then this is sealed against the pressurised medium without any additional sealing element. Also, in the event that the collar can abut the section of the wall of the sealing area between the section of the wall and the collar, then this is sealed against the pressurised medium without any additional sealing element.

The medium container may be firmly connected to the valve connecting element outside the area of the collar or the restoring element, so that the advantage of a preferably adjacent flat area press fit is maintained. For this purpose, it may be provided that the medium container is firmly connected to the valve connecting element by means of a screw connection and/or by an adhesive layer.

A screw is provided above the collar between the valve element and the valve connecting element. Alternatively, a sleeve-shaped restoring element and collar are reciprocally or successively inserted and the pressing section is enclosed by the restoring element and the collar, wherein the outer diameter of the pressing section, before assembling the valve connecting element, is greater than the inner diameter of the collar and/or the restoring element, so there is no need for a screw connection where the valve element or the separate, preferably sleeve-shaped, first segment of the valve element is pressed. The valve element is connected sufficiently firmly with the valve connecting element through the force and press fit.

The section of the wall of the valve connecting element may comprise at least one defined surface irregularity.

The medium container may be surrounded by a, preferably wound or braided, reinforcement layer. A reinforcing layer is mandatory in particular for pressures of the medium in the medium container within the typical range of several hundred bar internal pressure. The reinforcing layer may have filaments in the form of, for example, threads or fibres. The filaments may be formed from carbon, glass, polyamide, mineral materials, or a combination of the aforementioned materials. The reinforcing layer may be embedded in a matrix of thermoplastic or thermosetting resin.

Further, a part of the invention relates to a fuel conversion device with a fuel cell unit, at least a medium connecting line, at least a pressure reducer and at least a device according to the invention, in particular a device according to one of the claims 1 to 16, wherein the medium connecting line is conductively connected with the device with the fuel cell unit for the medium, and the pressure reducer is arranged in the medium flow direction upstream of the fuel cell unit.

Part of the invention is also a motor vehicle having a device according to the invention, in particular a device according to one of the claims 1 to 16, or with a fuel conversion device according to claim 17.

A method of assembling a device according to the invention for storage and delivery of a liquid and/or gaseous medium under pressure, in particular a device according to any one of the claims 1 to 16, comprises the following steps:
production of a medium container through a shaping process, preferably a blow moulding method,
arranging the valve connecting element on the medium container,
assembling the valve element, wherein the collar and the restoring element are pressed together between the section of the wall and the pressing section,
continuing the assembly of the valve member until the joint pressing of the collar and the restoring element leads to a deformation of the restoring element, which is greater than the maximum creep deformation of the collar over the service life of the device,
so that the creep deformation of the collar is compensated by the restoring element and a permanent press-fit is created between the pressing section, the collar, the restoring element and the section of the wall.

In the following, the invention is explained with reference only to embodiments represented in the drawings. These show schematically as follows.

In the figures, identical or functionally identical elements are provided with the same reference numerals.

Figure 1A:
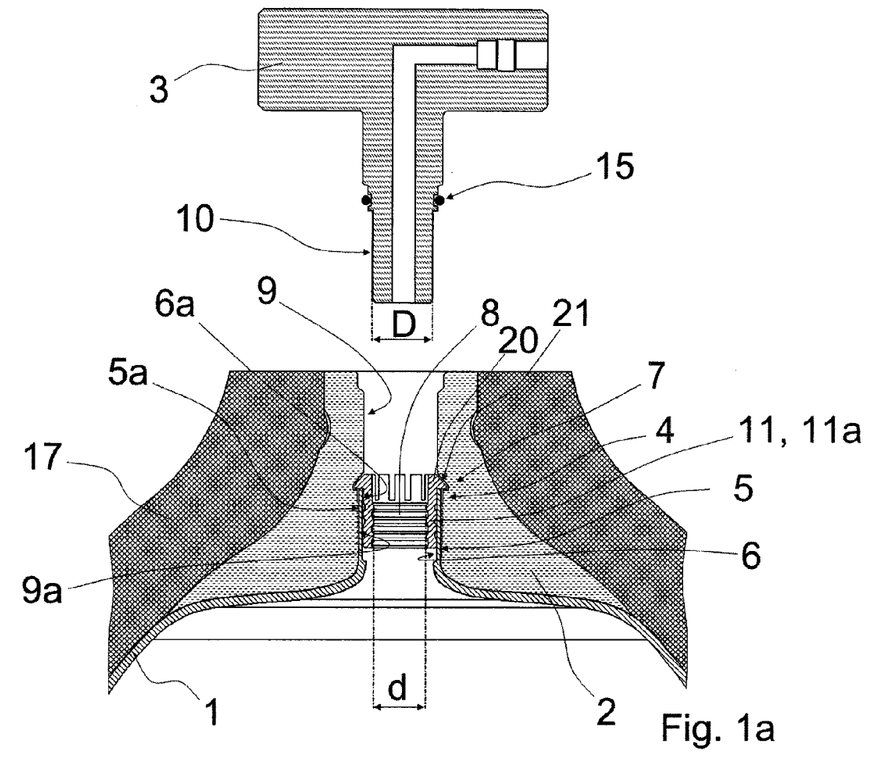
FIG. 1*a*, 1*b* show an axial longitudinal section through a device according to the invention before and after assembly of the valve element.
Figure 1B:
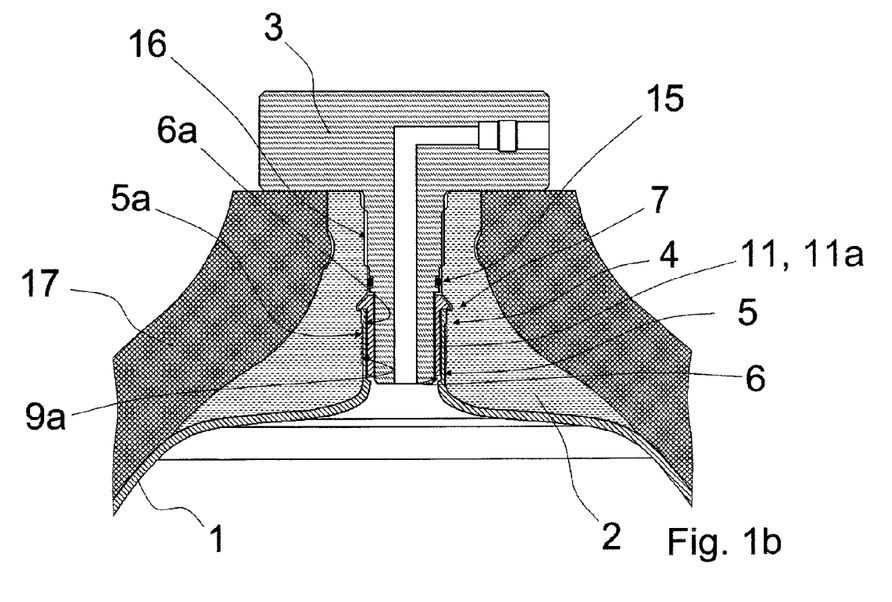
Figure 2A:
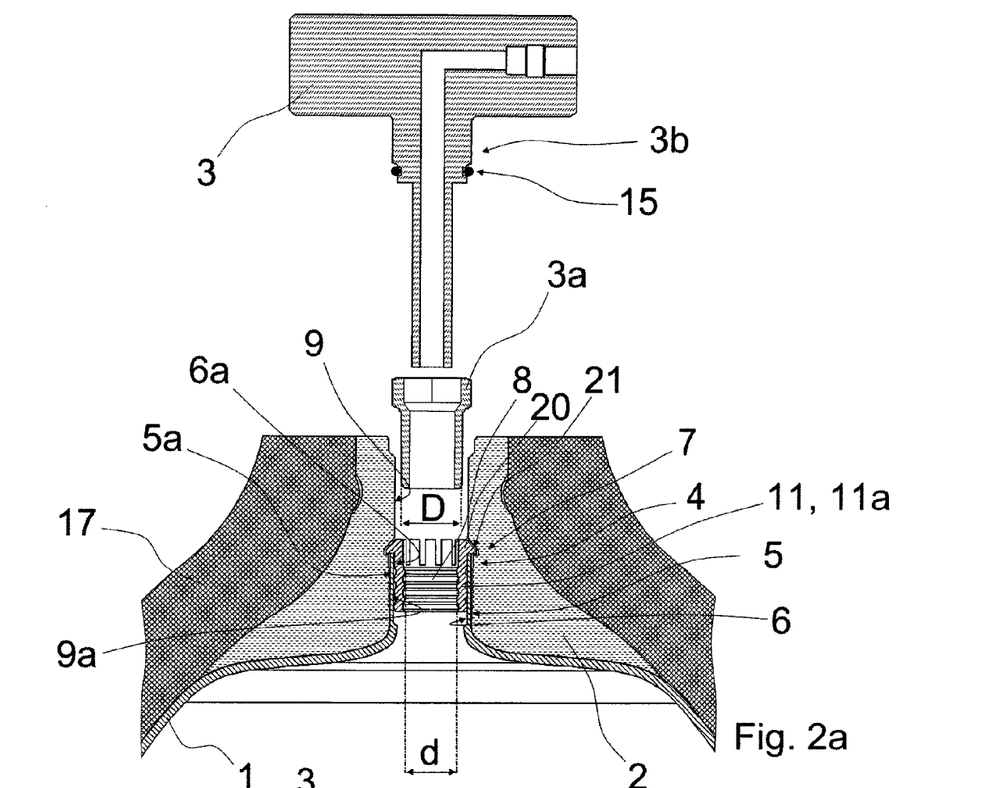
FIG. 2*a*, 2*b* show an axial longitudinal section through a further device according to the invention before and after assembly of the valve element.
Figure 2B:
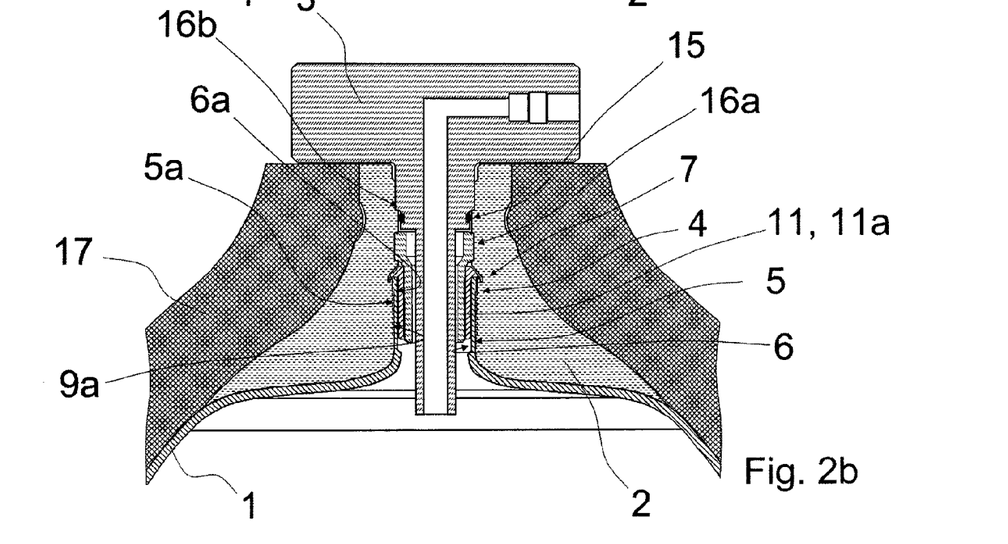
Figure 3A:
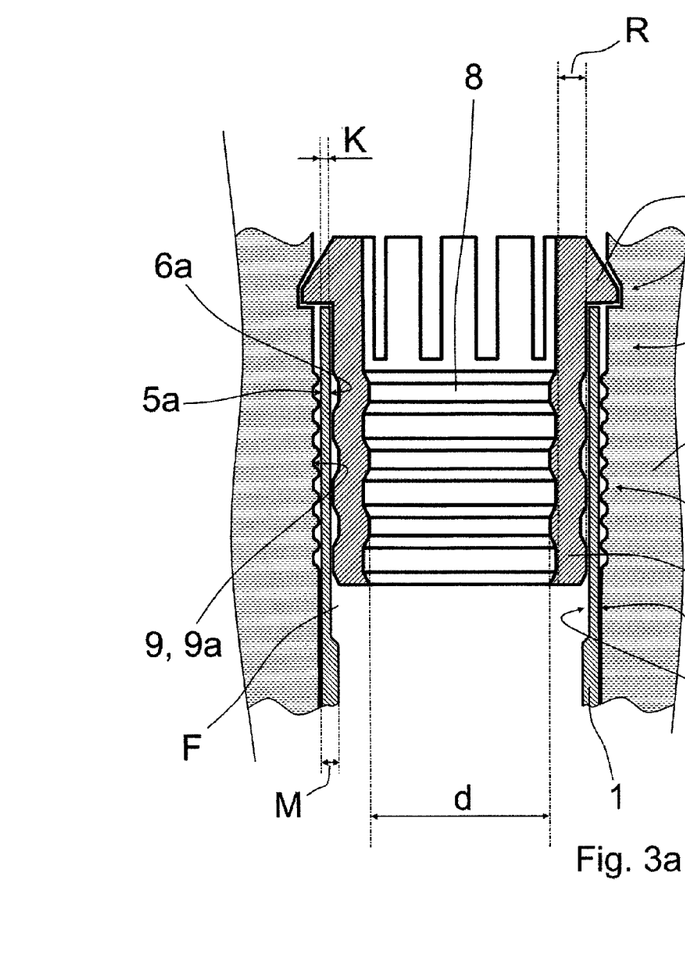
FIG. 3*a*, 3*b* show a detailed illustration of the axial longitudinal sections before and after assembly of the valve element of FIG. 1*a*, 1*b*, 2*a*, 2*b*, FIG. 4*a*, 4*b* show a detailed representation of an axial longitudinal section of a further device according to the invention.
Figure 3B:
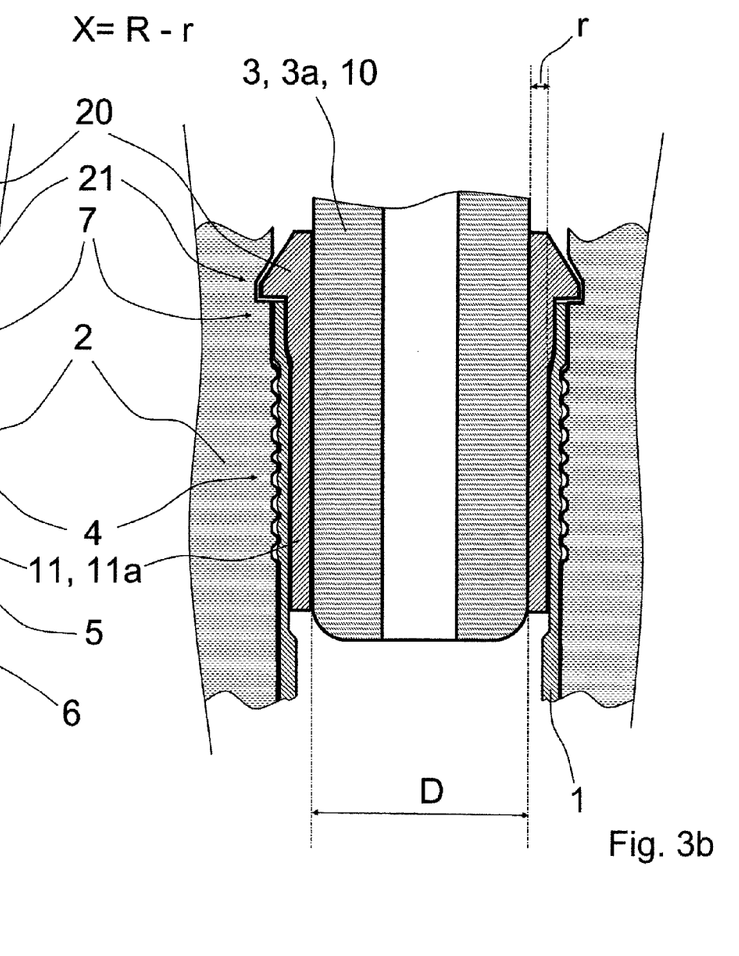

FIGS. 1a, 2a and 3a show an axial longitudinal section through a device according to the invention before assembly of a valve element 3. The devices shown here are for the storage and delivery of a liquid and/or gaseous medium, in particular hydrogen, under pressure, wherein a medium-holding medium container 1 is made of a plastic material, in this case of polyamide, and is connected to the medium container 1 via a valve connection element 2, preferably made of aluminium and the valve element 3 that can be connected to the valve connecting element 2. The medium container 1 has an integrally formed collar 4 extending from the medium container 1 to the outside with a collar outer wall 5 and a collar inner wall 6. The end 7 of the collar 4 defines the free cross-section of an opening 8 of the medium container. The valve connecting element 2 is arranged in the area of this opening 8 and a section 5a of the collar outer wall 5 is arranged opposite a section 9a of the wall 9 of the valve connecting element 2. The valve element 3 has a pressing section 10 which lies opposite a section 6a of the collar inner wall 6 as shown in the pre-assembled state in FIGS. 1b, 2b and 3b. In addition, a restoring element 11, 11a is arranged between the section 9a of the wall 9 and the pressing section 10 so that, during assembly of the valve element 3, the collar 4 and the restoring element 11, 11 are pressed together between the section 9a of the wall 9 and the pressing section 10. In this case, the restoring element 11, 11a is made of a cross-linked plastic material, in particular a cross-linked polyethylene. As shown in FIGS. 1b, 2b and 3b, the pressing section 10, the collar 4 and the restoring element 11, 11a are so matched and formed that, through the joint pressing of the collar 4 and restoring element 11, 11a, elastic deformation X of the restoring element 11, 11a can be set to be greater than the maximum creep deformation Y of the collar 4 over the service life of the device, so that the creep Y of the collar 4 can be compensated by the restoring element 11, 11a, while a permanent press fit is created between the pressing section 10, the collar 4 and the restoring element 11, 11a and the section 9a of wall 9. The press fit enables sealing of the respective seal area against the pressurised medium. FIGS. 3a and 3b show correspondingly enlarged detail views of the axial longitudinal sections shown in FIGS. 1a, 2a, 1b and 2b, wherein the inventive device can be seen. It can be seen that the elastic deformation of X, i.e. the difference between the wall thickness R of the restoring element and the wall thickness r of the restoring element, following the joint pressing of the collar 4 and the restoring element 11, 11a, corresponds to at least 0.3 times, preferably at least 0.5 times, more preferably at least 0.8 times, even more preferably at least 1.0 times, most preferably at least 1.2 times, the wall thickness K of the collar 4 prior to assembly of the valve element 3, 3a. The wall thickness R of the restoring element 11, 11a is at least 1.8 times greater than that of the section 5a of the collar outer wall 5 and the wall thickness K of the collar 4 enclosed by the section 6a of the collar inner wall 6. The restoring element 11a and the collar 4 are each sleeve-shaped and inserted in one another, and enclose the pressing section 10 of the restoring member 11a and the collar 4. Alternatively, one could also, contrary to the illustrations shown in FIGS. 1a to 3b, arrange the restoring element on the collar and inserted in the collar. The outer diameter D of the pressing section 10 before assembly of the valve element 3, 3a (see FIGS. 1a, 2a and 3b), is larger than the inner diameter d of the collar 4 and/or the restoring element 11a (see FIGS. 1a, 2a and 3a). The quotient (D−d)/d from the difference (D−d) of the outer-diameter D of the pressing section 10 and the inner diameter d of the collar 4 and/or the restoring element 11a before assembly of the valve element 3, 3a with respect to (=divided by) the inner diameter d of the collar 4 and/or the restoring element 11a before assembly of the valve element 3, 3a lies in a range from 0.001 to 0.3, preferably between 0.01 and 0.2, more preferably between 0.08 and 0.15, even more preferably between 0.1 and 0.12. The restoring element 11, 11a comprises a defined surface irregularity formed on or in the surface of the restoring element 11, 11a, in particular, by protrusions or recesses. This defined surface irregularity is formed through a restoring element 11, 11a that is waveform-shaped in the longitudinal section, wherein, in this case, the restoring element 11, 11a has a constant wall thickness R. As shown in FIG. 1a to 3b, a plurality of latching elements 20 are arranged on the restoring element 11, 11a, with a counterpart latching element 21 formed on the inner wall 9 of the valve connecting element 2 (in this case in the form of a circumferential groove), which interact in such a way that upon assembly of the valve element 3, 3a, there is a displacement of the restoring element 11, 11a relative to the valve connection element 2 and/or the collar 4. The provision of at least one latching element 20 offers the advantage that, during assembly of the valve element 3, 3a, the restoring element 11, 11a is secured quasi independently against squashing in the direction of the medium container 1, by means of the one or more latching elements 20 no longer being able to be disengaged from the counterpart latching elements 21, because they are prevented by the pressing section 10 springback. Another advantage of at least one latching element 20 is that the restoring element 11, 11a can be plugged onto or into the collar 4 even before the valve connecting element 2 is connected to the medium container 1 (for example by means of a screw connection and/or by means of an adhesive layer), since the restoring element 20 can be withdrawn by setting the valve connecting element 2 on the collar 4, and can only latch into the counterpart latching element 21 undercut in the end position of the valve connecting element 2 with respect to the medium container 1. The latching element 20 is preferably formed integrally with the restoring member 11, 11a, for example, through mechanical shaping (e.g. by milling) or shaping or forming during production (e.g. in the production of restoring element 11, 11a in a plastic injection moulding process). The wall thickness K of the collar 4 is less than the wall thickness M of the adjacent medium container 1. The restoring element 11, 11a is also lengthened during pressing, so that a free space F is created between the unpressed restoring element 11, 11a and the transition from the lower wall-thickness K of the collar 4 to the wall thickness of the adjacent M medium container. A sealing element 15 is provided in the form of an O-ring above the collar 4 and/or the restoring element 11, 11a, which additionally seals the valve connecting element 2 against the valve element 3. However, no separate sealing member is provided in and between the area of the pressing section 10 and the section 9a of the wall 9. This is not necessary due to the inventive design of the device. The section 9a of wall 9 has at least a defined surface irregularity in the form of a waveform-shaped structure. The medium container 1 is surrounded by a preferably wound or braided reinforcement layer 17 of carbon fibres in a thermoset matrix.

FIGS. 2a and 2b show that the valve element 3 may be formed in several parts, wherein the pressing section 10 is arranged on a separate, in this case sleeve-shaped, first segment 3a of the valve element 3. A sealing element 15 is likewise provided in the form of an O-ring above the collar 4 and/or the restoring element 11, 11a in order to additionally seal the valve connecting element 2 against the valve element 3. However, no separate sealing element is provided in and between the area of the pressing section 10 and the section 9a of the wall 9. This is not necessary due to the inventive design of the device. The above-mentioned sealing element 15 is arranged on a separate second segment 3b of the valve element 3 and can thus be easily replaced or serviced. Both the first segment 3a and the second segment 3b of the valve element 3 can be connected with the valve connecting element 2 by means of a screw 16a, 16b. For this purpose, a first screw connection 16a is thus provided between the first segment 3a and the valve connecting element 2 above the collar 4, while a second screw connection 16b is provided between the second segment 3b of the valve element 3 and the valve connecting element 2. The first segment 3a of the valve member 3 has a key recess for an Allen key, by means of which the first segment 3a can be connected to the valve connecting element 2 via the first screw 16a. The second segment 3b of the valve connecting element 3 has an extension of the medium-carrying valve arrangement, via which the medium can be supplied and removed through the valve connecting element 3 and 3b. The extension is so formed that it passes through or penetrates a continuous recess of the first segment 3a of the valve connecting element 3 and protrudes so far in the medium container 1 in the assembled state of the device that thermal loading of the device is reduced, especially during refilling of the medium container 1. To this end, the extension protrudes over the first segment 3a into the medium container 1. Preferably, in the assembled state of the device, the end of the extension protrudes into the lower part of the medium container by at least a distance from the first segment 3a greater than or equal to the outer diameter D of the pressing section 10 of the first segment 3a of the valve connecting element 3.

Figure 4A:
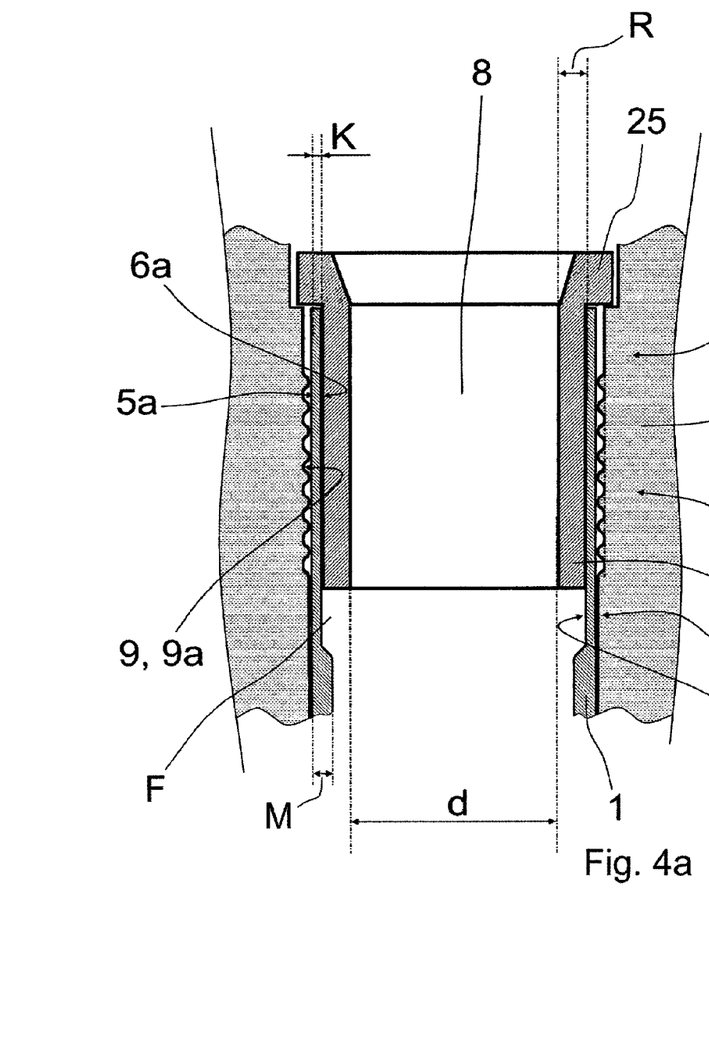
Figure 4B:
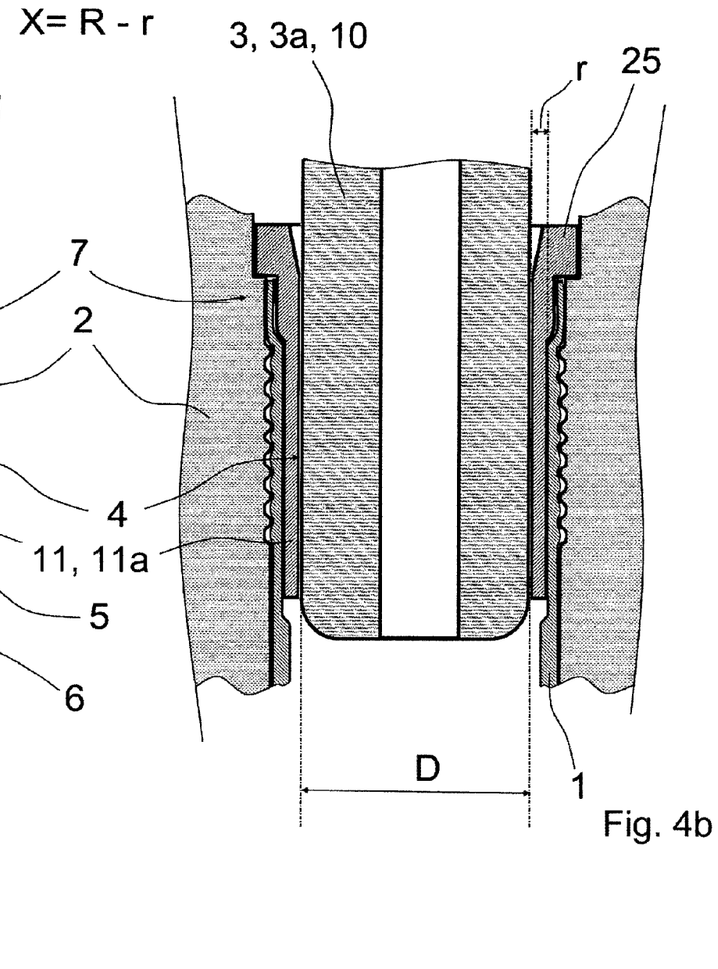

FIGS. 4a and 4b show a more detailed representation of a device according to the invention. The restoring element 11a and the collar 4 are here also sleeve-shaped and plugged into one another, and the pressing section 10 is enclosed by the restoring element 11a and the collar 4. Prior to assembly of the valve element 3, 3a, the outside diameter D (see FIG. 4b) of the pressing section 10 is greater than the inner diameter d (see. FIG. 4a) of the collar 4 and/or the restoring element 11a prior to assembly of the valve element 3, 3a. The quotient (D−d)/d from the difference (D−d) of the outer diameter D of the pressing section 10 and the inner diameter d of the collar 4 and/or the restoring element 11a prior to assembly of the valve element 3, 3a with respect to (=divide by) the inner diameter d of the collar 4 and/or the restoring element 11a before the assembly of the valve element 3, 3a, lies in a range from 0.001 to 0.3, preferably between 0.01 and 0.2, more preferably between 0.08 and 0.15, even more preferably between 0.1 and 0.12. The restoring element 11, 11a is made of a cross-linked plastic material. The pressing section 10, the collar 4 and the restoring element 11, 11a are so matched and formed that the joint pressing of the collar 4 and the restoring element 11, 11a causes an elastic deformation X (corresponding to the difference between the wall thickness R and the wall thickness r of the restoring element after the assembly of the valve connection element 2), which is greater than the maximum creep deformation Y of the collar 4 over the service life of the device, so that the creep Y of the collar 4 can be compensated by the restoring element 11, 11a, and a permanent press fit is created between the pressing section 10, the collar 4, the restoring element 11, 11a and the section 9a of the wall 9 to seal against the pressurised medium. The elastic deformation X corresponds to at least 0.3 times, preferably at least 0.5 times, more preferably at least 0.8 times, even more preferably at least 1.0 times, particularly preferably at least 1.2 times the wall thickness K of the collar 4 before assembly of the valve element 3, 3a, 3b. The sleeve-shaped restoring element 11, 11a has at its end remote from the medium container 1, a laterally protruding collar 25 which is partially or circumferentially arranged on the restoring element 11, 11a, and is, in particular, integrally formed. The collar 25 interacts here with a stepped undercut inside the wall 9 of the valve connecting element 2 and thus prevents the restoring element 11, 11a and/or the collar 4 being squashed towards the medium container 1 or pressed into the medium container 1 when assembling the valve element 3, 3a. The restoring element 11, 11a is inserted after the connection of the medium container 1 with the valve connecting element 2 in or on the collar 4.

Figure 5A:
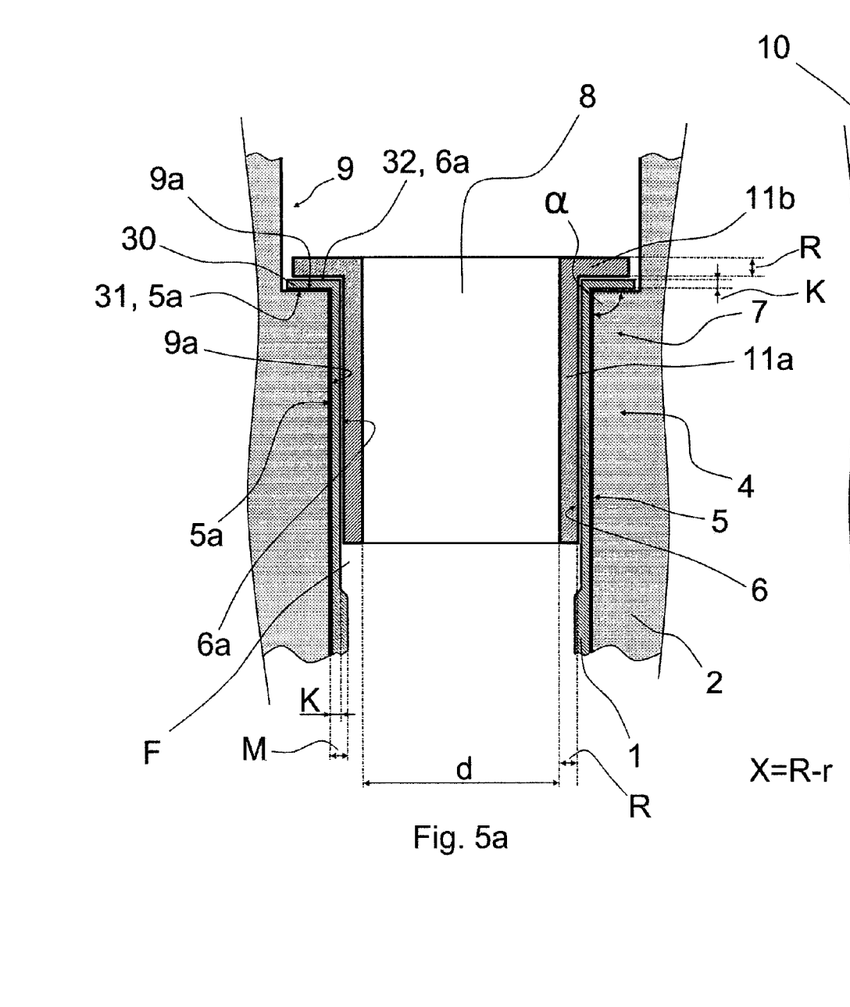
FIG. 5*a*, 5*b* show a detailed illustration of an axial longitudinal section of a further device according to the invention, FIG. 6*a, b, c* show a representation of the functional principle of the device according to the invention.
Figure 5B:
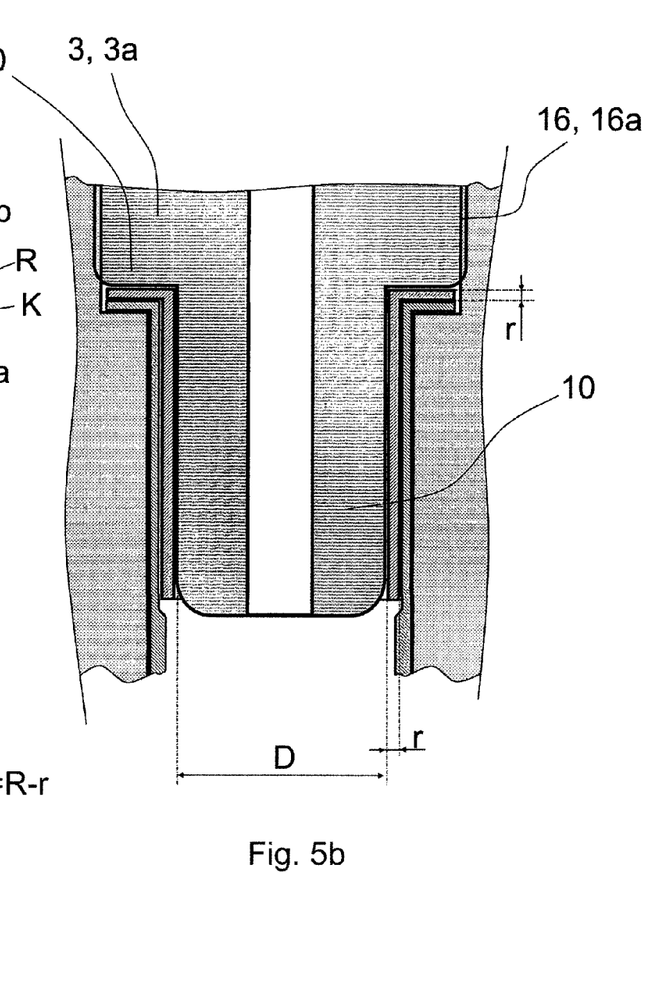

FIGS. 5a and 5b show a detailed view of a further embodiment of a device according to the invention, wherein the restoring element 11b is disc-shaped and wherein at the upper end 7 of the collar 4, there is a framing opening 8, wherein a flange 30 is integrally formed with the collar 4 enclosing an angle α in the range of 80° to 100°, wherein the flange underside 31 forms the section 5a of the collar outer wall 5, while the flange upperside 32 forms the section 6a of the collar inner wall 6. As shown in FIG. 5b, the joint pressing of the collar 4 and the restoring element 11b is carried out through the assembly of the valve element 3, 3a, wherein the flange 30 of the collar 4 and the restoring member 11b are pressed together between a first section 9a of the wall 9 and a first pressing section 10. In addition, the disc-shaped restoring element 11b is integrally connected with a sleeve-shaped restoring element 11a. In addition a further improved tightness of such a combined restoring element 11a, 11b is defined by the undercut formed between the sleeve-shaped and the disc-shaped restoring element 11a, 11b, wherein, during the assembly of the valve element 3, 3a, the pressing section 10 or the valve element 3, 3a is effectively prevented from squashing the restoring element 11a, 11b and/or the collar 4 or pushing it in the medium container 1. The elastic deformation X corresponds, in this case, to at least 0.3 times, preferably at least 0.5 times, more preferably at least 0.8 times, even more preferably at least 1.0 times, particularly preferably at least 1.2 times the wall thickness K of the collar 4 before assembly of the valve element 3, 3a. The valve connecting element 2 may be configured in two or more parts for this embodiment so that the valve connecting element 2 can be assembled around the collar 4 and the flange 30. Alternatively, the flange 30 can only be formed after the connection of valve connecting element and the medium container 1 (for example by a forming tool from an area of the collar 4).

A method of assembling devices for storage and delivery of a liquid and/or gaseous medium under pressure as shown in FIGS. 1a to 5b, comprises the steps of providing a medium container 1 preferably produced through a blow moulding process, arrangement of the valve connecting element 2 on the medium container 1, assembly of the valve element 3, 3a, wherein the collar 4 and the restoring element 11, 11a, 11b are pressed together between the section 9a of the wall 9 and the pressing section 10, continuation of the assembly of the valve element 3, 3a, the joint pressing of the collar 4 and the restoring element 11, 11a, 11b leading to a deformation X of the restoring element 11, 11a, 11b, which is greater than the maximum creep deformation Y of the collar 4 during the service life of the device, so that the creep Y of the collar 4 is compensated by the restoring member 11, 11a, 11b and a permanent press fit is created between the pressing section 10, the collar 4, the restoring element 11, 11a, 11b, and the section 9a of the wall 9. The press fit enables sealing of the respective sealing areas against the pressurised medium. The elastic deformation X corresponds to at least 0.3 times, preferably at least 0.5 times, more preferably at least 0.8 times, even more preferably at least 1.0 times, particularly preferably at least 1.2 times the wall thickness K of the collar 4 prior to assembly of the valve element 3, 3a.

Figure 6A:
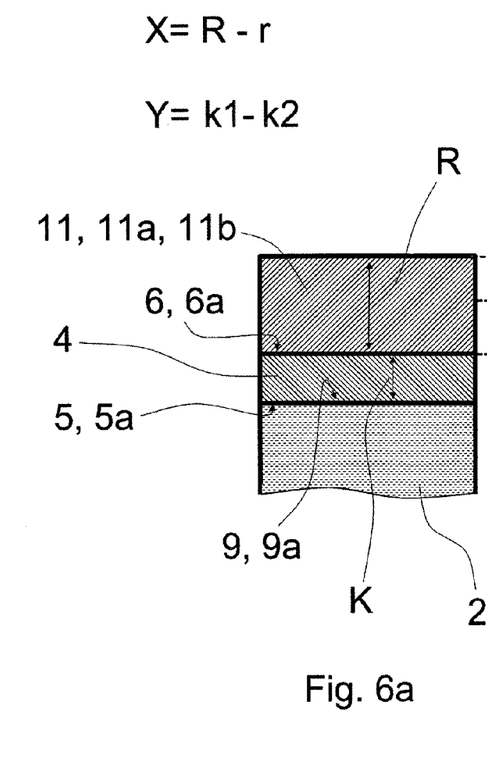
Figure 6B:
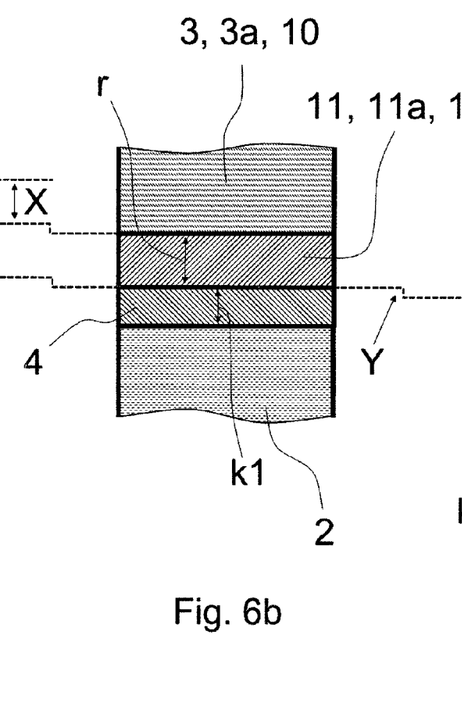
Figure 6C:
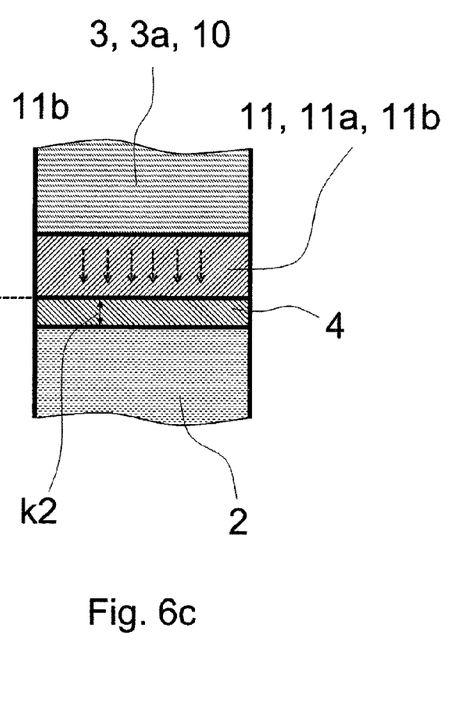

FIGS. 6a to 6c shows a schematic representation of the advantages of the device according to the invention. FIG. 6a, in this case, shows the condition of the device before assembly or prior to the connection of the valve element 3, 3a with the valve connecting element 2. A section 5a of the collar outer wall 5 is arranged opposite a section 9a of a wall 9 of the valve connecting element 2, wherein the valve element 3, 3a has a pressing section 10 which lies opposite a section 6a of the collar inner wall 6 in the assembled state of the device (see FIGS. 6b and 6c). A restoring element 11, 11a, 11b is also arranged between the section 9a of the wall 9 and the pressing section 10 so that during assembly of the valve element 3, 3a, the collar 4 and the restoring element 11, 11a, 11b are pressed together between the section 9a of the wall 9 and the pressing section 10 (see FIGS. 6b and 6c). The restoring element 11, 11a, 11b is made of a cross-linked plastic material, preferably cross-linked polyethylene. The pressing section 10, the collar 4 and the restoring element 11, 11a, 11b are so matched and formed that the joint pressing of the collar 4 and the restoring element 11, 11a, 11b causes an elastic deformation X of the restoring element 11, 11a, 11b, which is greater than the maximum creep deformation Y of the collar 4 over the service life of the device. The elastic deformation X corresponds to at least 0.3 times, preferably at least 0.5 times, more preferably at least 0.8 times, even more preferably at least 1.0 times, particularly preferably at least 1.2 times the wall thickness K of the collar 4 before the assembly of the valve element 3, 3a. The creep Y to be compensated results from the difference between the wall thickness k1 and the wall thickness k2 on achievement of the maximum creep or at an intermediate stage between the initial deformation in a state of pure elastic deformation of the collar 4 (corresponding to a wall thickness k1) and the wall thickness k2 during the creep deformation or at the maximum creep deformation Y. The creep deformation Y of the collar 4 can be compensated by the restoring member 11, 11a, 11b, so that a permanent press fit is created between the pressing section 10, the collar 4, the restoring element 11, 11a, 11b and the section 9a of the wall 9. The press fit allows sealing of the respective sealing areas against the pressurised medium. The wall thickness R of the restoring element 11, 11a, 11b is at least 1.8 times greater than the thickness K of the collar 4 before assembling the valve element 3, 3a. The springback or the balancing of the creep deformation Y of the collar 4 by the elastic springback of the restoring element 11, 11a, 11b is shown schematically in FIG. 6c by the dashed arrows.

Figure 7:
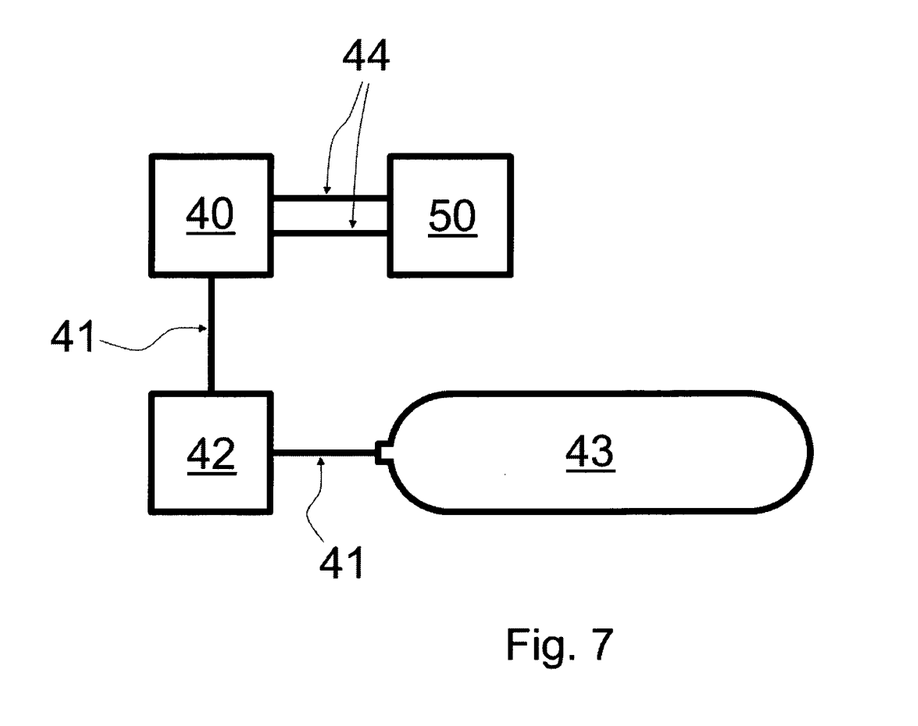
FIG. 7 shows an illustration of a fuel energy conversion device according to the invention.

FIG. 7 shows a fuel energy conversion device according to the invention with a fuel cell unit 40, a medium connecting line 41, a pressure reducer 42 and a device according to the invention 43. The medium connecting line 41 connects the device 43 medium-wise with the fuel cell unit 40. The medium stored in the device 43 according to the invention, in this case hydrogen, can flow to the fuel cell 40 via the medium connecting line 41. Since the pressurised medium (in this embodiment, hydrogen at 750 bar) is under a greatly increased pressure within the inventive device 43, a pressure regulator 42 is arranged in the medium flow direction upstream of the fuel cell unit 40. The electric energy converted in the fuel cell 40 from the fuel, in this case from hydrogen, is supplied to an electrical consuming device 50 (e.g. an electric motor) or an energy storage device 50 via electrical connecting lines 44 (e.g. a traction battery).

Figure 8:
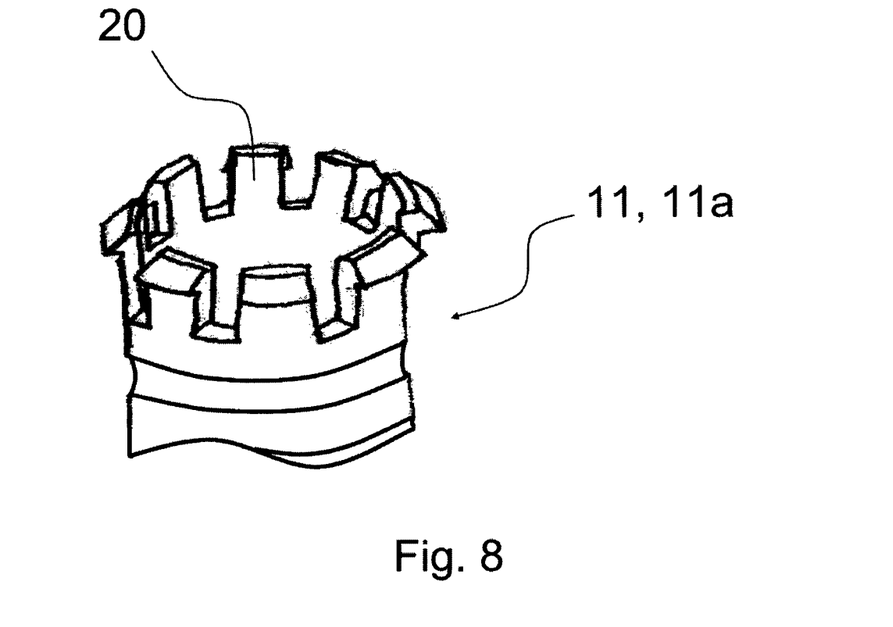
FIG. 8 shows a three-dimensional representation of a section of a restoring element from FIG. 1a to 3b.

FIG. 8 shows the restoring element shown in FIG. 1a to 3b 11, 11a, with a plurality of latching elements 20, which so interact with counterpart latching elements 21 formed on the inner wall 9 of the valve connecting element 2, that upon assembly of the valve element 3, 3a, there is a displacement of the restoring element 11, 11a relative to the valve connecting element 2 and/or the collar 4. In this case, the latching elements 20 are formed integrally with the restoring element 11, 11a.

The invention claimed is:

1. A device for storage and delivery of a liquid or gaseous medium under pressure, comprising:
   a medium-holding medium container made of a plastic material;
   at least one valve connecting element connected with the medium container;
   at least one valve element that can be connected with the valve connecting element;
   wherein the medium container is integrally formed with a collar protruding from the medium container and having a collar outer wall and a collar inner wall;
   wherein an end of the collar defines a free cross-section of an opening of the medium container;
   wherein the valve connecting element is arranged in an area of the opening, while a section of the collar outer wall is arranged opposite a section of a wall of the valve connecting element;
   wherein the valve element has a pressing section that lies opposite a section of the collar inner wall in an assembled state of the device;
   wherein, between the section of the wall and the pressing section, there is at least one restoring element that is arranged such that, upon assembly of the valve element, the collar and the restoring element are pressed together between the section of the wall and the pressing section;
   wherein the restoring element is made of a cross-linked plastic material;
   wherein the pressing section, the collar and the restoring element are matched and formed such that the joint pressing of the collar and the restoring element causes an elastic deformation of the restoring element, that is larger than a maximum creep deformation of the collar over a service life of the device;
   wherein the creep deformation of the collar is compensated by the restoring element and is compensated between the pressing section, the collar, the restoring element and the section of the wall.

2. The device according to claim 1, wherein the elastic deformation corresponds to at least 0.3 times to at least 0.8 times of a wall thickness of the collar.

3. The device according to claim 2, wherein a wall thickness of the restoring element is at least 1.5 times greater than the wall-thickness of the collar.

4. The device according to claim 2, wherein the wall thickness of the collar is less than a wall thickness of an adjacent medium container.

5. The device according to claim 1, wherein the restoring element and the collar are sleeve-shaped and plugged into one another, and the pressing section is enclosed by the restoring element and the collar, wherein an outer diameter of the pressing section is larger than an inner diameter of the collar or the restoring element before assembly of the valve element.

6. The device according to claim 1, wherein the restoring element is disc-shaped, wherein a flange is formed at the end of the collar framing the opening, and is integrally formed with the collar to enclose an angle in the range of 20° to 170°, wherein a flange underside forms the section of the collar outer wall, wherein a flange upperside forms the section of the collar inner wall.

7. The device according to claim 1, wherein the restoring element has at least one defined surface irregularity on or in the surface of the restoring element, wherein the defined surface irregularity includes protrusions or recesses.

8. The device according to claim 7, wherein the defined surface irregularity is formed by a waveform-shaped longitudinal or cross-sectional restoring element, wherein the restoring element includes a constant wall thickness.

9. The device according to claim 1, further comprising at least one latching element arranged on the restoring element that is operable to interact with a counterpart latching element on the wall of the valve connecting element such that, during assembly of the valve element, displacement of the restoring element relative to the valve connecting element or the collar is prevented.

10. The device according to claim 1, wherein the valve element is constructed in several parts, wherein the pressing section is arranged on a separate sleeve-shaped first segment of the valve element.

11. The device according to claim 1, wherein a sealing element is provided above the collar or the restoring element to seal the valve connecting element against the valve element.

12. The device according to claim 11, wherein the sealing element is arranged on a separate second segment of the valve element.

13. The device according to claim 1, wherein no separate sealing member is provided in the area of, and between, the pressing section and the section of the wall.

14. The device according to claim 1, wherein a screw is provided above the collar between the valve element and the valve connecting element.

15. The device according to claim 1, wherein the section of the wall has at least one defined surface irregularity.

16. The device according to claim 1, wherein the medium container is surrounded by a wound or braided reinforcement layer.

17. The device according to claim 1, wherein the device is operably associated with a motor vehicle.

18. A fuel energy conversion device, comprising:
a fuel cell unit;
at least a medium connecting line;
at least a pressure reducer; and
at least a device, comprising:
a medium-holding medium container made of a plastic material;
at least one valve connecting element connected with the medium container;
at least one valve element that can be connected with the valve connecting element;
wherein the medium container is integrally formed with a collar protruding from the medium container and having a collar outer wall and a collar inner wall;
wherein an end of the collar defines a free cross-section of an opening of the medium container;
wherein the valve connecting element is arranged in an area of the opening, while a section of the collar outer wall is arranged opposite a section of a wall of the valve connecting element;
wherein the valve element has a pressing section that lies opposite a section of the collar inner wall in an assembled state of the device;
wherein, between the section of the wall and the pressing section, there is at least one restoring element that is arranged such that, upon assembly of the valve element, the collar and the restoring element are pressed together between the section of the wall and the pressing section;
wherein the restoring element is made of a cross-linked plastic material;
wherein the pressing section, the collar and the restoring element are matched and formed such that the joint pressing of the collar and the restoring element causes an elastic deformation of the restoring element, that is larger than a maximum creep deformation of the collar over a service life of the device;
wherein the creep deformation of the collar is compensated by the restoring element and is compensated between the pressing section, the collar, the restoring element and the section of the wall;
wherein the medium connecting line connects the device with the fuel cell unit, and the pressure reducer is arranged in a medium flow direction upstream of the fuel cell unit.

19. The device according to claim 18, wherein the device is operably associated with a motor vehicle.

20. A method for assembling a device for the storage and delivery of a liquid or gaseous medium under pressure according to claim 1, comprising the steps of:
producing the medium container through a shaping process;
arranging the valve connecting element on the medium container;
assembling the valve element, wherein the collar and the restoring element are pressed together between the section of the wall and the pressing section;
continuing the assembly of the valve element to the joint pressing by the collar and the restoring element leading to the deformation of the restoring element, that is greater than the maximum creep deformation of the collar over the service life of the device;
wherein the creep deformation of the collar is compensated by the restoring element and a permanent press fit is created between the pressing section, the collar, the restoring element and the section of the wall.

* * * * *